Nov. 30, 1948.  P. K. CHATTERJEA ET AL  2,454,772
PULSE ECHO SYSTEM FOR DISTANCE MEASURING
Filed Dec. 10, 1942
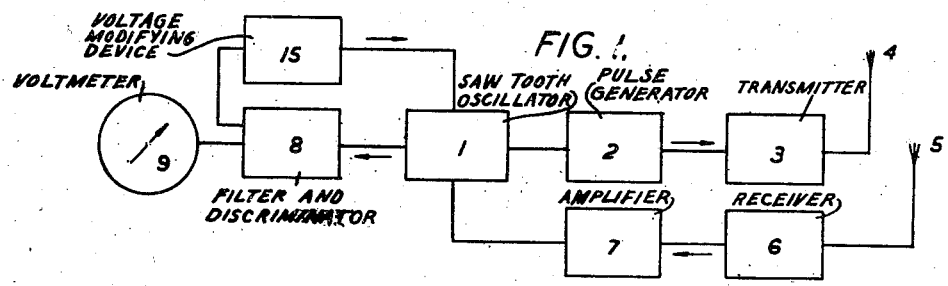
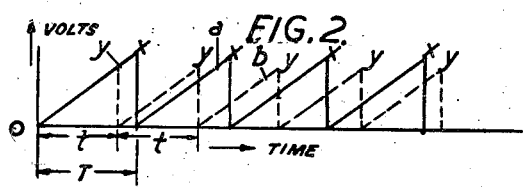
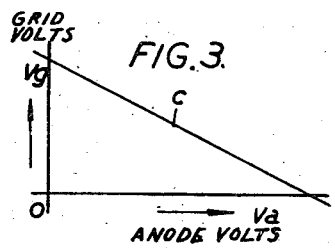
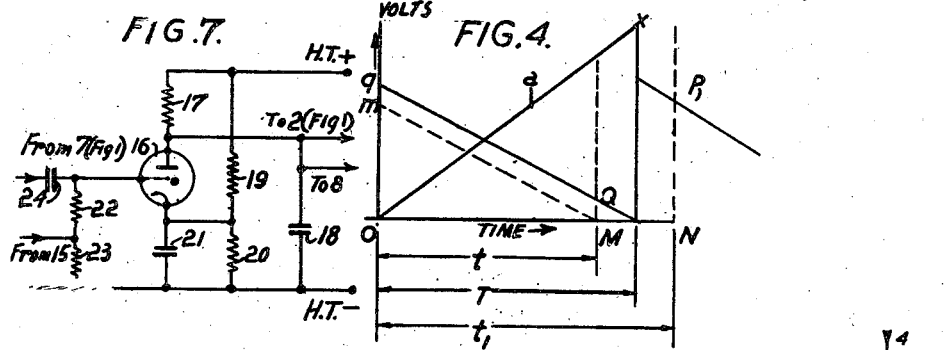
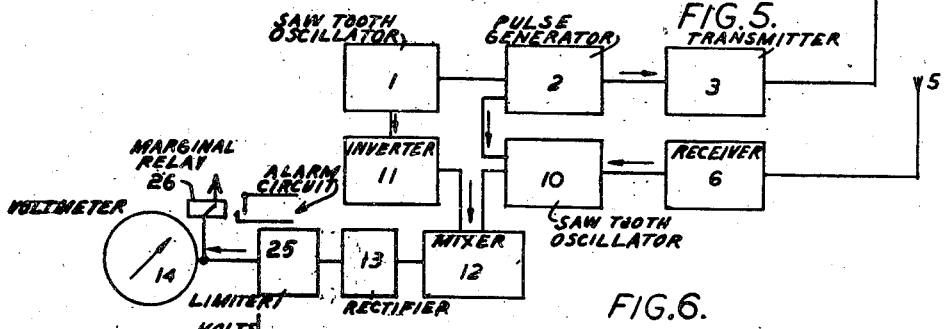
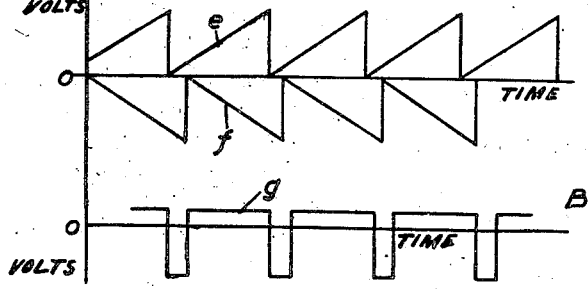
INVENTORS
P. K. Chatterjea
L. W. Houghton.
BY
Loyd Hall Sutton
ATTORNEY Patented Nov. 30, 1948

2,454,772

UNITED STATES PATENT OFFICE 2,454,772

PULSE ECHO SYSTEM FOR DISTANCE MEASURING

Prafulla Kumar Chatterjea and Leslie Wilfred Houghton, London W. C. 2, England, assignors to Standard Telephones and Cables Limited, London, England, a British company Application December 10, 1942, Serial No. 468,570
In Great Britain March 20, 1942

4 Claims. (Cl. 343—13)

This invention relates to methods of locating obstacles, such as aircraft, by means of reflected electromagnetic waves.

It provides a convenient means for indicating immediately on a direct current instrument the distance of the object, and the instrument may be calibrated in miles or kilometres if desired; and the arrangements can be easily adapted to give an alarm when an aeroplane, for example, comes within a predetermined distance. A continuous indication of the distance is given for the whole time that the obstacle is within the predetermined range.

According to the invention, there is provided an obstacle locating system comprising means for radiating trains of regularly repeated pulses of electromagnetic waves and means for receiving the pulses after reflection from the obstacle, in which the radiated pulses are derived from a sawtooth relaxation oscillator, characterised in this, that means is provided for causing the reflected pulses to synchronise a saw-tooth relaxation oscillator.

The invention will be more clearly understood from the following detailed description which refers to the accompanying drawing in which Figs. 1 and 5 show block schematic circuit diagrams of two embodiments;

Figs. 2, 3, 4 and 6 are diagrams used for explanatory purposes; and

Fig. 7 is a circuit diagram of a saw-tooth oscillator.

One embodiment of the invention is shown in the form of a block schematic circuit in Fig. 1. A saw-tooth relaxation oscillator 1 of conventional type controls a pulse generator 2, which delivers the pulses to the radio transmitter 3 and transmitting aerial 4. The pulses reflected from the object are picked up on the receiving aerial 5, and demodulated in the usual way in a radio receiver 6, and are then amplified, and if necessary reshaped in the pulse amplifier 7, and are returned to the relaxation oscillator 1 to control the saw-tooth waves generated. The operation of the circuit will be explained with reference to Fig. 2, in which the full line curve a represents the voltage of the saw-tooth oscillations plotted against time, assuming that no reflected pulses are being received. The period of these oscillations is $T$ seconds, the corresponding frequency being $$\frac{1}{T} \text{ per second}$$

The pulse generator 2 is designed according to known principles to emit a short pulse at the moment of each fly-back stroke of the oscillations, that is, at the times $x$ in Fig. 2. The time $T$ is chosen to be equal to twice the time necessary for a pulse to reach the most distant object the apparatus is designed to locate. Now suppose an object comes within the range of measurement, then reflected pulses will be received on the aerial 5 some time $t$ after they were radiated, $t$ being less than $T$. Consider a pulse radiated at zero time 0, Fig. 2. The corresponding reflected pulse will return after time $t$ at $y$ and the circuit is designed so that it causes the fly-back stroke to be produced by the oscillator 1 at that moment. The next pulse is at the same time emitted from the generator 2, and this pulse comes back after again a time $t$ and produces another fly-back stroke, and so on. Thus the oscillator now generates the wave shown by the dotted line $b$ in Fig. 2, the period being $t$ and the frequency $1/t$. Thus, the frequency of the oscillations generated by the oscillator 1 determines the distance of the object. To measure this frequency, the output of the oscillator 1 is applied to the device 8 which comprises a filter for separating out the fundamental frequency $1/t$, and a discriminator circuit of some known type giving, for example, a continuous output voltage proportional to the frequency. This may be connected to a suitable voltmeter 9, the indications of which can clearly be calibrated in terms of the distance of the object, if desired.

It is to be noted that direct transmission from aerial 4 to aerial 5 does not matter, because transmitted and reflected pulses always occur at the same time, although each reflected pulse corresponds to the previous transmitted pulse. Therefore the combined effect of the transmitted and reflected pulse synchronize the oscillator 1 and thus it is not actually necessary to have two aerials: the same one may be used for both purposes.

Reflected pulses will, of course, be received from objects while they are beyond the operating range of the apparatus, and although they may be of small amplitude, they may still be able to control the saw-tooth oscillator 1. Since the reflected pulses will return after a time greater than the period $T$ of the oscillator 1, extra pulses will be generated, but the irregular train so obtained will not be confused with the regular train produced by objects which are within range.

If desired, however, impulses reflected from objects outside the range of the apparatus or unwanted impulses reflected from other objects nearby may be prevented from producing any effect in the following way.

It is well known to use a gas discharge triode or similar device to operate a saw-tooth oscillator. Such devices are described for example on page 456 of "Television," by Zworykin and Morton, published 1940 by John Wiley & Sons, Inc., New York. With the control grid biassed with a given negative voltage, the valve becomes conducting when the anode reaches a certain positive potential, when it discharges the condenser in the relaxation circuit. This potential is inversely related to the grid voltage; that is, when the grid voltage increases (becomes less negative), the anode firing potential decreases. The incoming pulses synchronise the oscillator by suddenly increasing the grid voltage, causing the valve to fire, and the grid voltage change necessary to fire the valve will be smaller when the anode voltage is high, than when it is low. This effect is shown in Fig. 3 by the line $c$ which relates the anode voltage $Va$ of the gas discharge valve to the corresponding grid voltage $Vg$ necessary to cause the valve to fire. The values of $Vg$ are referred to a zero represented by the normal grid bias voltage chosen for the circuit, and they give the amount by which the grid voltage must be changed in order to fire the valve when the instantaneous anode potential is given by the corresponding abscissa. When the valve is generating saw-tooth oscillations, the anode voltage is constantly varying so that the grid voltage change necessary to fire the valve at any point in the charging stroke will vary in a corresponding manner. This is shown in Fig. 4 where the curve $a$ shows on a larger scale the anode voltage during the saw-tooth oscillations, taken from Fig. 2. The line $Qq$ shows the corresponding change in the grid voltage $Vg$ necessary to produce a flyback stroke at the time indicated by the abscissa, as obtained from Fig. 3. At the time $x$ corresponding to the normal fly-back stroke, the firing grid voltage change is, of course, zero.

The method of eliminating the effect of reflected pulses which are outside the range of the measuring device consists in applying to the grid of the gas discharge valve a variable bias which is determined by the frequency of the saw-tooth oscillations. This bias is arranged to be just enough to prevent the valve from being fired by the pulses from the amplifier 7 of Fig. 1 at any time except just before the normal firing time at $x$, Figs. 2 and 4, or after a period only slightly different from the period of the previous cycle. Thus in Fig. 4, if the reflected pulses arrive after a time $t$ which is less than $T$, they will have to overcome a small bias QM, which they will be able to do. The frequency will be changed to $1/t$ and it is arranged that the grid bias is thereby changed so that the line $Qq$ moves down to $Mm$ passing through the point M where the vertical line QM cuts the time axis.

If a reflected pulse should arrive from a more distant obstacle after a time $t_1$ which is slightly greater than $T$, the valve will have already fired at the normal time $T$, only shortly before, and the grid bias PN which must be overcome by the incoming pulse is now large. The pulse will moreover be of smaller amplitude owing to the greater distance of the obstacle, and the circuit conditions can be chosen so that it will be unable to fire the valve again. When the obstacle moves within range, the reflected pulse will be able to take control as soon as the time $t$ of arrival becomes equal to or less than $T$, and the grid bias will be thereafter varied as the time $t$ becomes smaller, so as to maintain the intersection M of QM and $Mm$ practically on the time axis. The reflected pulse will retain control, while the object moves about, until $t$ becomes greater than $T$. The necessary variable grid bias is produced by obtaining from the discriminator 8 in Fig. 1 a proportion of the output voltage, which will be proportional to the frequency. This may be amplified (or attenuated) as necessary in the device 15 and applied in any convenient way as a grid bias to the oscillator 1 as indicated.

Fig. 7 shows the circuit arrangement of the saw-tooth oscillator 1, Fig. 1. A gas discharge triode 16 is caused to generate a saw-tooth wave form according to known practice by means of anode resistance 17 and charging condenser 18. A standing bias is provided for in the usual manner by the potentiometer resistance 19 and 20 connected between H. T. positive and earth which is also the H. T. negative with condenser 21 acting as a cathode by-pass condenser. The grid circuit is completed by resistances 22 and 23 in series.

The saw-tooth wave form which is developed across condenser 18 is fed to the pulse generator 2 of Fig. 1. Reflected pulses shaped by the amplifier 7 are fed in known manner via condenser 24 to the grid of valve 16 where if the standing bias voltage is of the correct value, each pulse will trigger valve 16 so initiating another flyback stroke and hence a radiated pulse as already explained.

A voltage from the device 15, Fig. 1, is developed across resistance 23 and will vary the negative bias applied to valve 16 by the resistance 20. Hence the arrangement is such that when the oscillator valve 16 is running normally without a synchronizing signal at its lowest frequency, it will have a maximum negative bias so that the amplitude of a pulse supplied by amplifier 7, Fig. 1, over condenser 24 will only be sufficient to trigger valve 16 if it occurs just before the normal firing time, as has been explained with reference to Fig. 4. A located obstacle approaching the locator will, of course, cause the saw-tooth frequency to increase causing a corresponding reduction of the negative bias voltage.

With the arrangement just described, obstacles outside the range of the apparatus will not produce any indication.

Fig. 5 shows another arrangement according to the invention. A saw-tooth oscillator 1, pulse generator 2, radio transmitter 3 and aerial 4 are arranged as in Fig. 1. The receiving aerial 5 and receiver 6 are also as before, but the reflected pulses after demodulation in 6 are applied to synchronise another saw-tooth oscillator 10. An inverting device 11, which may comprise an amplifying valve, inverts the saw-tooth waves generated by 1, and applies them to the mixer 12 to be combined with the waves at the output of oscillator 10. Assuming that the waves generated by the oscillator 1 are as shown by the curve $a$ in Fig. 2, the waves generated by oscillator 10 will be as shown by curve $e$ in Fig. 6; they will be like those of Fig. 2, but displaced by a time $t$. Curve $f$ of Fig. 6 shows the waves of Fig. 2 after inversion by the device 11. After these two waves have been mixed together in 12 they will appear as shown in Fig. 6 at $g$. They are then applied to a rectifier 13 which converts them into unidirectional pulses having the same duration as before, equal to the time interval $t$ between the original and reflected pulses, the pulses being repeated at intervals of T. If these unidirectional pulses be now applied to an ordinary direct current instrument, such as a voltmeter 14, the reading obtained will be $t.V/T$, where V is the voltage corresponding to the height of the unidirectional pulses. Thus since T is known, the voltmeter reading gives $t$, and hence the distance of the object.

It may be mentioned that if desired, the sawtooth waves from the oscillator 10 could be inverted instead of those from oscillator 1 before mixing in the device 12. The resulting unidirectional pulses would be of the opposite sign, but the operation would be otherwise the same.

In order to keep the system stable when no reflected pulses are being received, it is preferable to feed a weak synchronising pulse from the generator 2 to the generator 10 so that the curves e and f in Fig. 6 will cancel each other and produce no pulses g. It can be seen from Fig. 6 wave form g, that when $t$ is a little less than T, the upper portion of the pulses g are long, and if the device 13 be arranged to shift these pulses upwards until the lower portions coincide with the zero axis, then a large effective voltage will be applied to the meter 14. If $t$ is a little greater than T, then this voltage will be very small, because then the upper portions of the pulse g will be small. This affords a means of giving an alarm when the obstacle comes within range, since the sudden change from a small to a large voltage at the terminals of the meter 14 when time $t$ becomes just less than T can be made to perform some function such as the operation of a marginal relay 26 which closes an alarm circuit. The synchronising pulse should of course be sufficiently weak to be over-ruled when any reflected pulses are received.

The meter 14 may clearly be calibrated in terms of the distance of the object and this calibration will be independent of the amplitude of the reflected pulses. In case the amplitude of the saw-tooth oscillations should not be maintained sufficiently constant, the calibration would be affected, but this can be overcome by the use of amplitude limiting arrangements for the final pulses g so that their amplitude would become independent of that of the oscillations. An amplitude limiter 25 of known kind is therefore inserted between the rectifier 13 and the voltmeter 14. The measurements depends on the duration of the g pulses which in turn depends on the timing of the fly-back stroke and not on the actual amplitude of the saw-tooth waves.

It will be apparent that if the instruments 8 or 14 are suitably calibrated they will give an immediate indication of the distance of the object as soon as it comes within range. No manual adjustments are required, and the object is kept continuously under observation. Also, since it is easy to provide alarm arrangements in the manner explained, the constant presence of an operator is not necessary.

Although the invention has been described in terms of particular embodiments, it is not intended to be limited thereto, and various modifications will occur to those skilled in the art.

What is claimed is:

1. System for measuring the distance of an object comprising a sawtooth wave oscillator having a normal operative period, a pulse generator controlled by said saw-tooth wave oscillator for generating electrical pulses, a radio transmitter, means for modulating the output of said radio transmitter by said electrical pulses, means for receiving and detecting the pulse modulated waves after reflection by said object whereby electrical pulses are obtained, means for applying said received electrical pulses to said saw-tooth wave oscillator to initiate the fly-back stroke thereof prior to the normal termination of said period and thereby to control its frequency, an indicating device, means for deriving from an output of said saw-tooth wave oscillator a voltage proportional to the frequency of the resultant generated sawtooth waves, and means for applying said voltage to said indicating device.

2. A system for measuring the distance of an object according to claim 1, wherein said saw-tooth wave oscillator is adjusted to have a minimum frequency such that the period of a saw-tooth wave cycle is at least equal to twice the time necessary for a pulse modulated wave to reach the most distant object which it is desired to locate.

3. A system for measuring the distance of an object according to claim 1, wherein means is provided for applying a biassing voltage proportional to the resultant frequency of the generated saw-tooth waves to said saw-tooth wave oscillator.

4. A system for measuring the distance of an object comprising a saw-tooth wave oscillator having a normal operative period, a pulse generator controlled by the output of said oscillator, means for transmitting pulses derived from said pulse generator, means for receiving said pulses after reflection by an object, means for applying said received pulses to said oscillator prior to the normal termination of said period to synchronize said oscillator at a frequency which is inversely proportional to the distance of the object, and means for indicating the distance of said object comprising means for measuring a characteristic of said oscillator.

PRAFULLA KUMAR CHATTERJEA.
LESLIE WILFRED HOUGHTON.

REFERENCES CITED

The following references are of record in the file of this patent:

UNITED STATES PATENTS

| Number | Name | Date |
|---|---|---|
| 1,585,591 | Lowy | May 18, 1926 |
| 1,945,952 | Nicolson | Feb. 6, 1934 |
| 2,143,035 | Smith | Jan. 10, 1939 |
| 2,189,549 | Hershberger | Feb. 6, 1940 |
| 2,266,154 | Blumlein | Dec. 16, 1941 |
| 2,301,195 | Bradford | Nov. 10, 1942 |
| 2,333,688 | Shepard, Jr. | Nov. 9, 1943 |

FOREIGN PATENTS

| Number | Country | Date |
|---|---|---|
| 469,417 | Great Britain | July 26, 1937 |